May 25, 1948.   F. ROONEY   2,441,976
DEVICE FOR TILTABLY MOUNTING CIRCULAR SAW BLADES UPON AN ARBOR
Filed Nov. 29, 1945
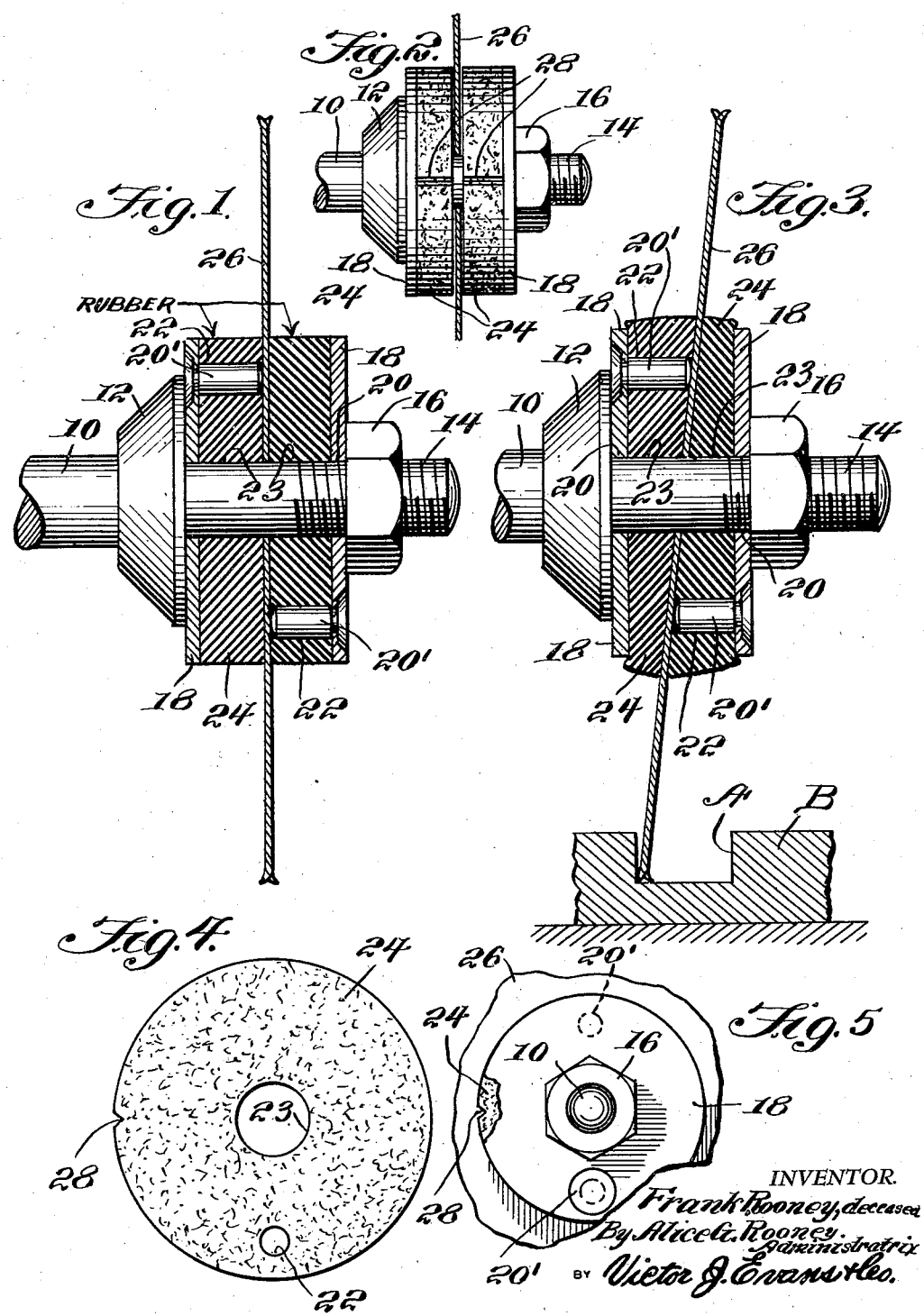
INVENTOR.
Frank Rooney, deceased
By Alice G. Rooney, administratrix
BY Victor J. Evans & Co.
ATTORNEYS Patented May 25, 1948

2,441,976

UNITED STATES PATENT OFFICE 2,441,976

DEVICE FOR TILTABLY MOUNTING CIRCULAR SAW BLADES UPON AN ARBOR

Frank Rooney, deceased, late of Fargo, N. Dak., by Alice G. Rooney, administratrix, Fargo, N. Dak., assignor, by decree of court, to Alice G. Rooney Application November 29, 1945, Serial No. 631,529

1 Claim. (Cl. 144—238)

This invention relates to an attachment for circle saws, and the main purpose of the invention is to permit the saw to be used for cutting grooves and the like.

Another object of the invention is to provide an attachment, the use of which will enable the operator to make a clean precise cut, rather than an uneven rough cut.

A further object of the invention is to provide an attachment by means of which the angle of the saw with reference to the arbor may be varied at will.

With these and other objects and advantages in view, the invention consists of the novel details of construction, arrangement and combination of parts more fully hereinafter described, claimed and illustrated in the accompanying drawing, in which—

Figure 1 is a side view partly in section of an embodiment of the invention;

Figure 2 is a side view showing the indicating marks;

Figure 3 is a side view partly in section showing the inclination of the saw and its cutting capacity;

Figure 4 is a front view of one of the washers, and

Figure 5 is an end view.

Referring more in detail to the drawing, the reference numeral 10 indicates the arbor, and 12 the collar on the arbor, the face of which is at right angles to the axis of the arbor.

The outer end of the arbor is screw-threaded at 14 for screw-thread engagement with the tightening nut 16.

Two discs 18 having medial openings 20 are positioned on the arbor 10 and one bears on the collar 12 and one bears on the nut 16. The discs 18 always assume a position at right angles to the axis of the arbor.

The discs 18 are provided with inwardly extending pins 20' which are adapted to extend through apertures 22 in the resilient washers 24 which are made of rubber and are mounted on the arbor 10 by means of medial openings 23 and have contact with the discs on their outer sides and are disposed on either side of the circle saw 26 and contact the side face of the saw.

The washers are marked at 28 which are at points 90° from the pins to facilitate proper placement of the washers and discs, since the pins in the discs are positioned at opposite sides of the arbor.

The pins extend through the washers and contact the saw therefore when the nut 16 is tightened, the angle of the saw with relation to the axis of the arbor will be varied depending upon the amount of turns imparted to the nut 16.

The circular saw can be adjusted to cut any width of groove as shown in Figure 3 and it will cut a clean and precise groove A in the work B.

It is believed the operation of the device will be apparent from the foregoing description when taken in conjunction with the drawing and that it is to be understood that minor changes and modifications may be resorted to without departing from the spirit of the invention or the extent of the appended claim.

Having thus described the invention, what is claimed as new and desired to be secured by Letters Patent is:

A device of the character described comprising an arbor, a collar affixed to said arbor and having a face disposed at right angles to the axis of the arbor, a nut threadably engaged upon the arbor, a pair of discs slidably mounted upon the arbor between the nut and the face of the collar, each of said discs having a pin extending in the direction of the other of said discs, said pins being located on diametrically opposite sides of said arbor, radially spaced therefrom and parallel thereto, a pair of resilient washers each normally of a thickness equal to the length of said pin and having an opening for the reception of said pin and mounted upon the arbor between the discs and a circular saw loosely mounted upon the arbor between the washers.

ALICE G. ROONEY,
*Administratrix of the Estate of Frank Rooney, Deceased.*

REFERENCES CITED

The following references are of record in the file of this patent:

UNITED STATES PATENTS

| Number | Name | Date |
|---|---|---|
| 162,010 | Banister | Apr. 13, 1875 |
| 591,180 | Thakeray et al. | Oct. 5, 1897 |
| 658,212 | Garrison | Sept. 18, 1900 |

FOREIGN PATENTS

| Number | Country | Date |
|---|---|---|
| 61,976 | Switzerland | July 31, 1912 |